United States Patent [19]

Beard, Jr.

[11] Patent Number: 4,635,758
[45] Date of Patent: Jan. 13, 1987

[54] HYDRAULIC CONTROL SYSTEM FOR SIMULTANEOUS APPLICATION OF BRAKES OF TOWING AND TOWED VEHICLES WITH EQUAL INTENSITY

[76] Inventor: Frank A. Beard, Jr., P.O. Box 5145, Clearwater, Fla. 33518

[21] Appl. No.: 874,188

[22] Filed: May 22, 1986

Related U.S. Application Data

[63] Continuation-in-part of Ser. No. 746,631, Jun. 19, 1985, abandoned.

[51] Int. Cl.⁴ .............................................. B60T 7/20
[52] U.S. Cl. .................... 188/3 H; 188/345; 303/6 A; 303/7; 303/49
[58] Field of Search ........................... 303/7–8, 303/48–49, 50, 52, 6 A; 188/3 R, 3 H, 106 P, 112, 151, 152, 345–348; 280/421

[56] References Cited

U.S. PATENT DOCUMENTS

| | | | |
|---|---|---|---|
| 1,986,799 | 1/1935 | Dickey | 188/3 H |
| 2,013,033 | 9/1935 | Clarke | 188/3 H |
| 2,084,191 | 6/1937 | Carroll | 188/3 H |
| 2,085,869 | 7/1937 | Ross | 188/3 H |
| 2,145,661 | 1/1939 | Mayer et al. | 188/3 H |
| 2,153,111 | 4/1939 | Watson | 188/3 H |
| 2,184,042 | 12/1939 | Harrington | 188/3 H |
| 2,202,070 | 5/1940 | Van Deren | 188/3 H |
| 2,262,844 | 11/1941 | Goepfrich | 188/3 H X |
| 2,325,846 | 8/1943 | Forbes | 188/3 H |
| 2,674,349 | 4/1954 | Phillips | 188/3 H |
| 2,711,228 | 6/1955 | Shank | 188/3 R |
| 3,135,358 | 6/1964 | Greentree | 188/3 R |
| 3,190,700 | 6/1965 | Fites | 303/48 |
| 3,650,570 | 3/1972 | Meeks | 303/49 X |
| 3,747,987 | 7/1973 | Hendrickson | 188/3 R X |
| 4,015,720 | 4/1977 | Peché | 303/48 X |

FOREIGN PATENT DOCUMENTS

| | | | |
|---|---|---|---|
| 1135317 | 8/1962 | Fed. Rep. of Germany | 188/3 H |
| 1491809 | 9/1966 | France | 303/49 |

*Primary Examiner*—Douglas C. Butler
*Attorney, Agent, or Firm*—Herbert W. Larson; Joseph C. Mason

[57] ABSTRACT

Hydraulic brake system between two vehicles provides for simultaneously braking both vehicles with equal intensity. An auxiliary master cylinder in the towing vehicle controls, through fluid pressure, four auxiliary brake cylinders, the middle two being part of a removable unit. The fourth auxiliary cylinder exerts fluid pressure during a towing mode, on the conventional brake system of the towed vehicle through a valve that shuts down the pressure exerted by the towed vehicle's master cylinder during the towing mode.

7 Claims, 8 Drawing Figures

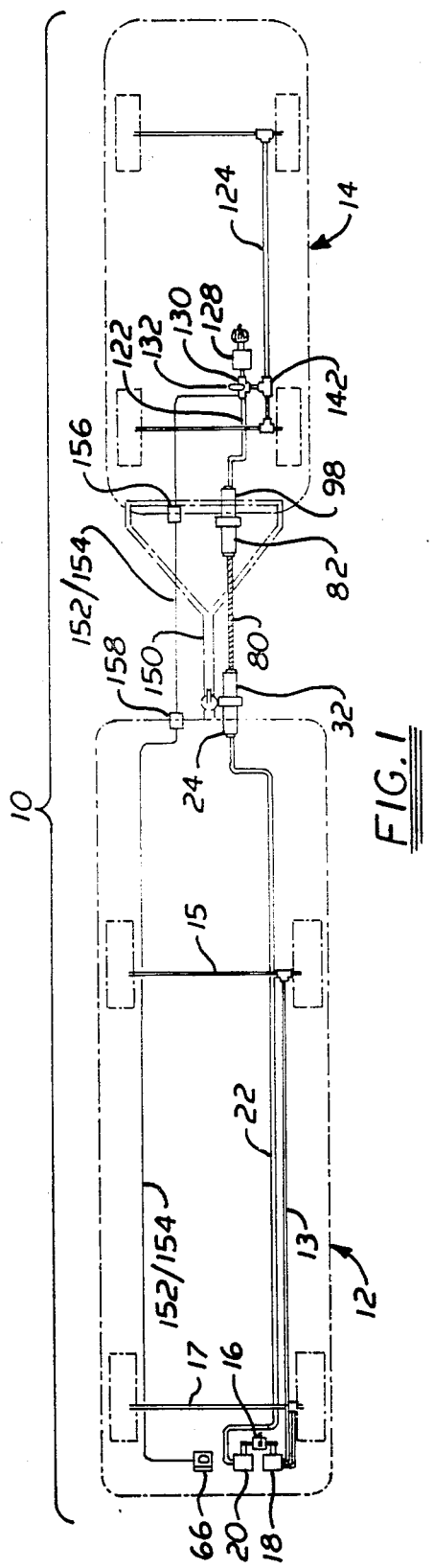
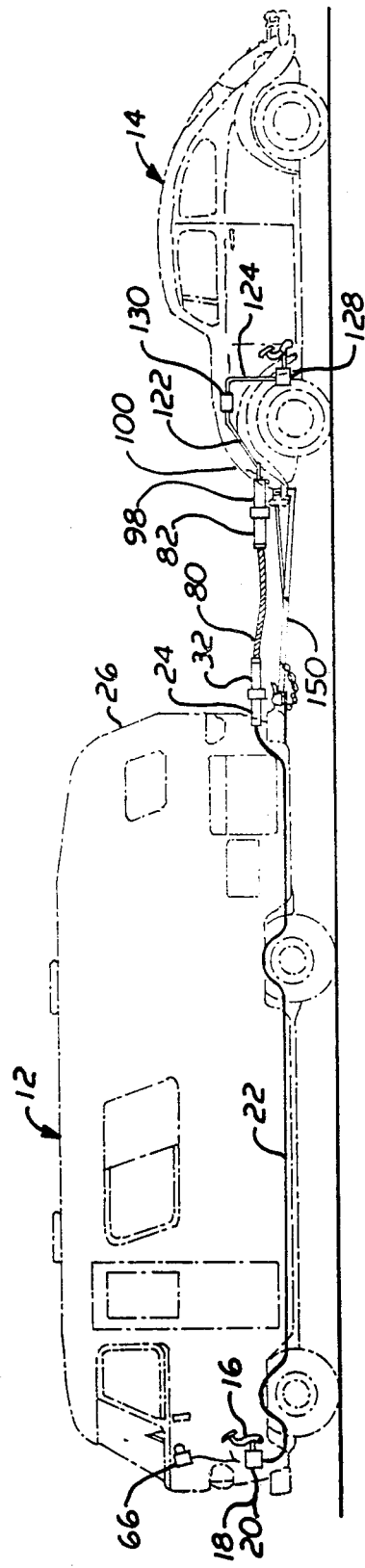

HYDRAULIC CONTROL SYSTEM FOR SIMULTANEOUS APPLICATION OF BRAKES OF TOWING AND TOWED VEHICLES WITH EQUAL INTENSITY

PRIOR APPLICATION

This application is a continuation-in-part of application Ser. No. 746,631, filed on June 19, 1985, now abandoned.

BACKGROUND OF THE INVENTION

1. Field of the Invention

This invention relates to improvements in hydraulic braking systems employed to stop towing and towed vehicles. More particularly, it refers to a hydraulic braking system mechanically activated in the towing vehicle to simultaneously brake the towing and a towed vehicle with equal intensity.

2. Description of the Prior Art

Hydraulic braking systems of various configuration have been heretofore used between towing and towed vehicles as shown in U.S. Pat. No. 1,986,799 and U.S. Pat. No. 3,650,570. In the former patent, a simple hydraulic connection between vehicles is set forth. However, this system does not provide for simultaneous braking of the towing and towed vehicles because only one master cylinder is located in the towing vehicle. Also, provision for switching the towed vehicle from its own brake system to one in the towing mode is absent. The latter patent describes the use of an auxiliary master cylinder in the towed vehicle together with a valve arrangement to control flow of brake fluid within the towed vehicle. Such a system does not provide simultaneous braking with equal intensity in both vehicles.

SUMMARY OF THE INVENTION

My improved hydraulic braking system comprises three separate hydraulic brake units mechanically joined together so that actuation of the first unit transmits a force to the second unit which in turn transmits a force to the third unit. The first hydraulic brake unit is located in a towing vehicle and is actuated simultaneously with actuation of the principal braking system in the towing vehicle by mechanical depression of the brake pedal. An adjustable piston in an auxiliary brake cylinder is located at the end of the first unit farthest away from the brake pedal. The second unit containing an auxiliary brake cylinder at each end separated by a brake fluid conduit can be easily disengaged when the towed vehicle is separated. The towed vehicle contains a valve in its braking system which is the third unit described above. This valve allows the pressure exerted by the brake fluid to be either from the second unit when in the towing mode or from the master cylinder of the towed vehicle when disconnected from the towing mode.

The braking system is designed to safely apply and control the towed vehicle's brakes from the driver's seat of the towing vehicle. The system is flexible enough to adapt to installation on either motor homes towing cars or trailers, or cars or trucks towing trailers or other vehicles that have hydraulic brake systems. Proper installation and use of the brake system allows the driver of the towing vehicle to control the intensity of application of the brakes on the towed vehicle in proportion to the intensity of application of the brakes of the towing vehicle. The connecting link between the towing and towed vehicle can be easily and routinely removed and stored in the trunk of the towing or towed vehicle when the two vehicles are separated from each other. Tamper resistant locks, audible warning sounds, as well as dash board warning lights also aid the safety of the system. Since the towing vehicle has its own separate brake system not integrated with the towing brake system, there will be no effect on the brakes of the towing vehicle even if the towing brake system is disengaged or defective.

BRIEF DESCRIPTION OF THE DRAWINGS

FIG. 1 is a plan view of the vehicles and hydraulic brake components.

FIG. 2 is an elevation of the vehicles and hydraulic brake components.

BRIEF DESCRIPTION OF THE INVENTION'S BEST MODE

Figure 3:
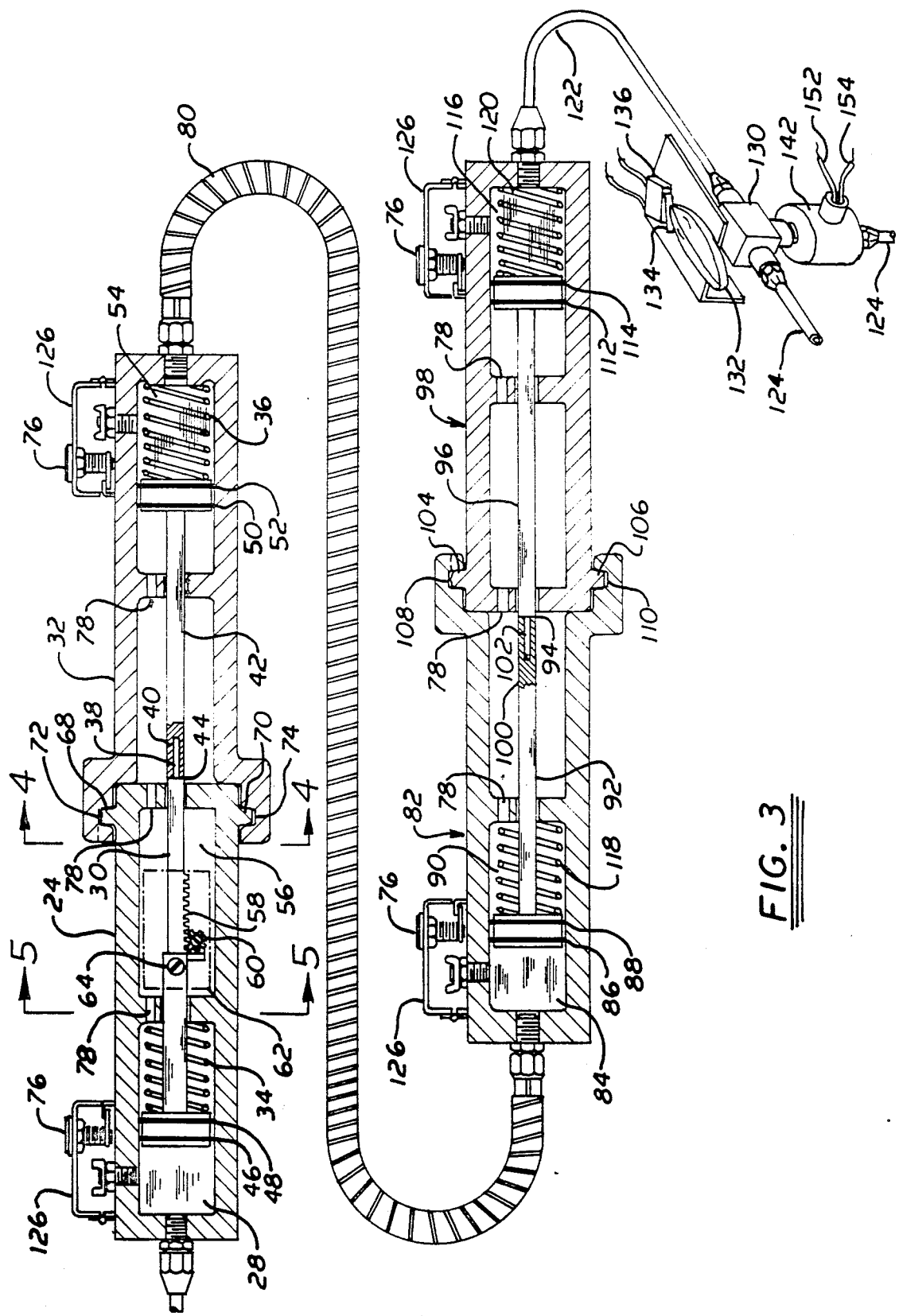
FIG. 3 is a sectional view showing the hydraulic/mechanical components of the brake system.

The hydraulic brake system 10 controls the simultaneous braking of a towing vehicle 12 and towed vehicle 14. A brake pedal 16 in the towing vehicle 12 simultaneously activates through hydraulic pressure a first master cylinder 18 controlling front wheel and rear wheel brakes in the towing vehicle 12 and a second master cylinder 20 controlling hydraulic fluid pressure through a first brake fluid conduit 22 to a first auxiliary brake cylinder 24 which is mounted on the rear end 26 of the towing vehicle 12. This system constitutes a first hydraulic brake unit.

The brake system in the towing vehicle utilizing master cylinder 18 and its fluid conduits 13, 15 and 17 are conventional and are not described in further detail.

The second master cylinder 20 in the towing vehicle 12 controls hydraulic brake fluid pressure in conduit 22 which will generally run the shortest possible distance to the first auxiliary brake cylinder 24.

FIG. 3 shows a horizontal section of the first auxiliary brake cylinder 24. This cylinder 24 is activated when fluid pressure is exerted through the brake fluid conduit 22 thereby causing a buildup of fluid pressure in fluid chamber 28. As the driver of the towing vehicle 12 applies additional foot pressure to the brake pedal 16, pressure in fluid chamber 28 rises and the adjustable hydraulic piston 30 is extended into a second auxiliary brake cylinder. When the driver of the towing vehicle 12 eases the pressure of his or her foot on the brake pedal 16, fluid pressure subsides causing the pressure in fluid chamber 28 to subside. Once the pressure within fluid chamber 28 begins to subside, springs 34 and 36 partially or totally remove adjustable hydraulic piston 30 from within cylinder 32. Piston 30 also has a tip 38 that fits into the nose 40 of piston 42 contained within the second brake cylinder 32. The two pistons 30 and 42 respectively will meet in a nose to nose 44 configuration. Seals 46 and 48 in first brake cylinder 24 and seals 50 and 52 respectively in second brake cylinder 32 prevent the flow of brake fluid oil from the respective fluid chambers 28 and 54. Spring 36 exerts a slightly greater force than spring 34 to prevent disengagement of pistons 30 and 42.

The adjustable hydraulic piston 30 is a solid metal cylinder, with gear teeth 58, that may be extended four to eight inches into the piston chamber 56 by use of an adjusting mechanical pinion gear 60. This pinion gear 60 is reached from the outside of cylinder 24 by a key locked door 62 for security. Adjustment in the overall length of piston 30 is made by opening this key locked door 62 and turning the pinion gear 60 with a common screw driver. The gear is then locked in place with the screw driver via a set screw 64 when the desired overall piston length is obtained. The key locked door 62 is then closed and locked 77 to prevent tampering with the settings. In the fully retracted position of the adjustable piston 30, no hydraulic pressure is exerted on the brake system of the towed vehicle. In an extended position, internal pressure builds up even when the driver of the towing vehicle 12 is not applying the brakes. This built up pressure is used to bring the brake system of the towed vehicle 14 up to the pressure where its brakes are almost ready to activate. Then, when the driver of the towing vehicle 12 applies his brakes, the brakes of the towed vehicle 14 instantly respond, the intensity of the response being determined by the pressure applied to the brakes of the towing vehicle. A warning light 66 on the dash board of the towing vehicle 12 lights up anytime the brakes of the towed vehicle 14 are even partially activated. Therefore, if there is too much internal pressure within the system due to the adjustable piston 30 being extended too long, the warning light will light on the dash of the towing vehicle and the overall length of the adjustable piston 30 can be decreased. The tip 38 of the adjustable hydraulic cylinder 30 is approximately one and one half inches in length and fits into a hole in piston 42 to assure a firm connection during use.

Figure 4:
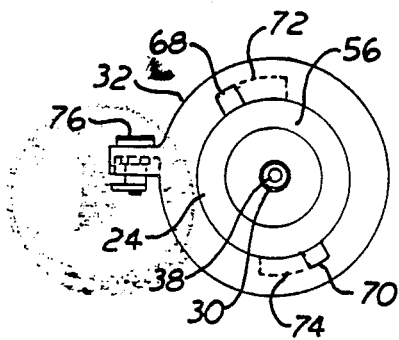
FIG. 4 is an end elevation view 4—4 of the locking coupling in FIG. 3.
Figure 5:
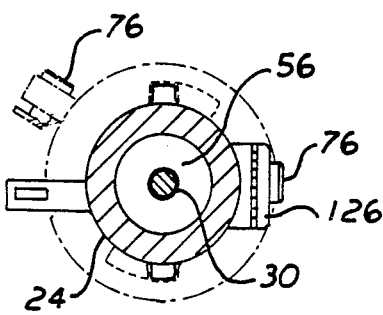
FIG. 5 is an end section 5—5 of the first brake cylinder in FIG. 3.
Figure 6:
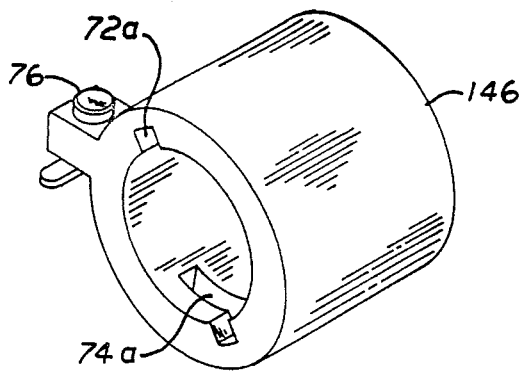
FIG. 6 s a perspective of a dust cap for the first and fourth auxiliary brake cylinders.
Figure 7:
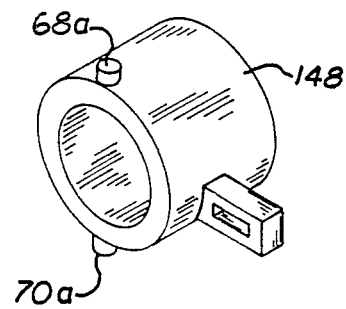
FIG. 7 is a perspective of a dust cap for the second and third auxiliary brake cylinders.

The first auxiliary brake cylinder 24 is locked into the second auxiliary brake cylinder 32 by virtue of prongs 68 and 70 that snap into grooves 72 and 74. A twisting action locks the two brake cylinders together. See FIGS. 4 and 5. A lock 76 requiring a key to operate, must be opened before cylinder 24 can be separated from cylinder 32. This is a safety feature to guard against tampering or accidental disconnection while in use. Also, it should be noted that the nearly air tight nature of the connection between cylinder 24 and cylinder 32 requires that internal air holes 78 exist within both cylinders 24 and 32 so that hydraulic pressure levels are not influenced by changes in air pressure internally as the system operates.

The fluid from chamber 54 can flow freely into the second brake fluid conduit 80. This conduit is usually a flexible hose covered by standard metal mesh for protection. The fluid in the second brake fluid conduit 80 exerts pressure on a third auxiliary brake cylinder 82 by exerting pressure on the fluid in chamber 84 within the third auxiliary brake cylinder 82. Seals 86 and 88 prevent entry of the fluid into the piston chamber 90.

A piston 92 within the third brake cylinder 82 is also in nose to nose contact 94 with a piston 96 in a fourth auxiliary brake cylinder 98. This fourth brake cylinder 98 is mounted on the front end 100 of the towed vehicle 14. Piston 96 has a tip 102 that fits into a corresponding hole in piston 92 to provide locking engagement.

The third auxiliary brake cylinder 82 is locked to fourth brake cylinder 98 by prongs 104 and 106 engaging in slots 108 and 110 in the end of the third brake cylinder 82. This engagement is the same as described in FIG. 4 and 5 for cylinders 24 and 32. Seals 112 and 114 prevent fluid in the fourth brake cylinder reservoir 116 from leaking out. Brake cylinder 82 contains a spring 118 to retract the piston when brake fluid pressure is diminished. This likewise occurs in cylinder 98 by action of spring 120. The brake fluid from the fourth auxiliary brake cylinder 98 is in pressure contact with fluid in a third fluid conduit 122 that has access to the fourth fluid conduit 124 found in the towed vehicle 14.

During initial installation of the brake system and afterwards during maintenance, it may become necessary to bleed the brake fluid from cylinders 24, 32, 82 or 98. To make this possible, a key locked access door 126 is attached to the top wall of each brake cylinder fluid reservoir, 28, 54, 84 and 116. This door can be opened by the same key used to open the access door 62 to the adjustable piston 30 whenever a brake fluid escape is needed for the bleeding process or to double check fluid levels.

It should be noted at this point that cylinder 32, conduit 80 and cylinder 82 are permanently attached to each other and serve as the second hydraulic brake unit or the "Portable Hydraulic Linking Assembly" between the towing vehicle 12 and the towed vehicle 14. Thus, when cylinder 24 and cylinder 32 are detached from each other, and cylinder 82 and cylinder 98 are detached from each other, the "Portable Hydraulic Linking Assembly" can be stored in the trunk or outside storage compartment of the towing or towed vehicle while the towed vehicle is in use. When connected to the rest of the system, the "Portable Hydraulic Linking Assembly" basically transmits the hydraulic pressure from cylinder 24 on through to the mechanisms permanently attached to the towed vehicle 14 which ultimately will be transmitted to the brake lines of the towed vehicle in direct proportion to the intensity of the application of the brakes within the towing vehicle 12.

Auxiliary brake cylinder 98 is mounted near the front center 100 of the towed vehicle 14 (the exact position of which will vary depending on the make and model of the towed vehicle). When the system is in use, cylinder 82 of the Portable Hydraulic Linking Assembly is connected and locked by key to cylinder 98 to prevent tampering or accidental disconnection while in use. Guide prong 104 and 106 (identical to prongs 68 and 70) located on the end of the cylinder 98, is inserted within a hollow cavity 108 and 110 (identical to cavities 72 and 74) within the cylinder 82 as cylinders 82 and 98 are connected together. When the driver of the towing vehicle applies pressure to the brakes of the towing vehicle 12, the piston 96 is retracted from cylinder 82, thus applying pressure against brake cylinder chamber 116 thereby compressing it. The increased fluid pressure within brake cylinder chamber 116 is then transmitted to conduit 122 which is an additional brake conduit that connects cylinder 98 to the brake conduit 124 of the towed vehicle 14. When the driver of the towing vehicle releases his foot pressure on the brakes of the towing vehicle, the fluid pressure in the system subsides and springs 118 and 120 return the pistons toward their neutral positions. Note that the spring tension of spring 120 is slightly greater than the spring tension of spring 118 to guard against accidental separation of pistons 92 and 96.

The towed vehicle 14 has a standard master cylinder 128 that is in liquid contact with the fourth fluid line 124 throughout the system of the towed vehicle 14 and actuates the front and rear brakes of towed vehicle 14 in a conventional manner. Inserted into conduit 124 is a three-way ball valve 130 which is connected at two ends to conduit 124 and at one end to conduit 122 coming from the fourth auxiliary brake cylinder 98. The three-way ball valve 130 is opened and closed mechanically by virtue of a handle 132 which sits on top of the valve 130. When the pressure of liquid from the third conduit line 122 is exerted on the fourth conduit line 124, the valve handle 132 appears as set forth in FIG. 3 and is contacting contact 134 so that the limit switch 136 actuates audible alarm 138 and light alarm 140 to the dash of the towed vehicle 14 in case the handle 132 has not been turned to allow the master cylinder of the towed vehicle to be placed in service. These alarms prevent use of the towed vehicle when the master cylinder of the towed vehicle is not operating.

In the position shown in FIG. 3, the master cylinder of the towed vehicle 14 is not in pressure contact with the fluid system in line 124. Therefore, actuation of the brake in vehicle 12 has a direct affect on the braking system of the towed vehicle 14 by virtue of the first 24, second, 32, third 82 and fourth 98 brake cylinders.

Figure 8:
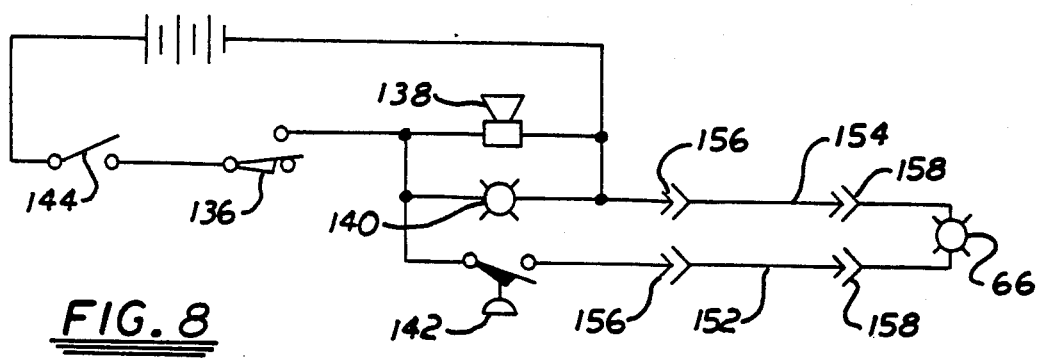
FIG. 8 is an electrical schematic of the vehicles, showing the electrical system employed with the hydraulic brake system.

A pressure switch 142 is also inserted below the valve 130 to notify the driver of the towing vehicle 12 that the brake system in the towed vehicle 14 is being actuated. The electrical system from the pressure switch 142 goes in parallel to the towed vehicle alarms 138 and 140 but in series with limit switch 136, as seen on the electrical diagram FIG. 8 when the key switch 144 is closed.

It should be noted that when the Portable Hydraulic Linking Assembly is detached from the system to release the towed vehicle 14, a protective cap 146 is placed over the exposed end of cylinders 24 and 98 and locked in place with the same key used to lock cylinders 24 and 32 together when the system is in use. Slots 72a and 74a receive prongs 68 and 70 from cylinder 24 or 104 and 106 from cylinder 98. Protective cap 148 is used at the ends of the second brake cylinder 32 and the third brake cylinder 98. Prongs 68a and 70a fit into slots 72 and 74 on cylinder 32 or in slots 108 and 110 in cylinder 82.

The fixed towing apparatus 150 must be in place before attaching the Portable Hydraulic Linking Assembly of this invention.

The wires 152/154 from pressure switch 142 are connected to plug 156 on the towed vehicle 14 and then are connected from plug 156 to plug 158 on the towing vehicle. From plug 158 the electrical lines proceed directly to the light alarm 66 in the towing vehicle.

Variations in the above system can be easily recognized by one having ordinary skill in the art but does not deviate from the operating mode set forth above.

I claim the following:

1. Hydraulic brake system controlling the simultaneous braking of a towing and towed vehicle comprising:
   (a) a brake pedal in the towing vehicle simultaneously activating a first master cylinder controlling front wheel and rear wheel brakes in the towing vehicle and a second master cylinder independent of the first master cylinder controlling fluid pressure through a first brake fluid conduit mounted in the towing vehicle to a first auxiliary brake cylinder mounted on the rear end of the towing vehicle;
   (b) the first auxiliary brake cylinder having an adjustable piston in nose to nose contact with a piston in a second auxiliary brake cylinder, the second auxiliary brake cylinder being separated from a third auxiliary brake cylinder by a second brake fluid conduit exterior of the towing and towed vehicles;
   (c) a piston in the third auxiliary brake cylinder being in nose to nose contact with a piston in a fourth auxiliary brake cylinder mounted on the front end of the towed vehicle;
   (d) the towed vehicle having a three way valve inserted in a fourth brake fluid conduit mounted within the towed vehicle and in fluid contact with a third master brake cylinder mounted in the towed vehicle, the valve having a means for opening or closing the fourth brake fluid line to prevent flow of fluid from the master cylinder in the towed vehicle to front and rear brake cylinders in the towed vehicle;
   (e) a third auxiliary brake fluid conduit in fluid contact with the three way valve at one end and in fluid contact with a brake fluid reservoir in the fourth auxiliary brake cylinder at its other end, the valve having a means controlled by the handle for opening or closing the end of either brake fluid conduit in contact with the valve;
   (f) the valve controlling the flow of brake fluid from the third brake fluid conduit to the brake fluid in the fourth brake fluid conduit;
   (g) the valve being configured so that when fluid from the third brake fluid conduit is in contact with fluid in the fourth brake fluid conduit, the fluid from the master cylinder in the towed vehicle is prevented from being in contact with the fluid of the fourth brake fluid conduit; whereby when pressure in the brake pedal of the towing vehicle activates the second master cylinder and the third master cylinder in the towed vehicle is not in fluid contact with the fourth brake fluid conduit extending beyond the valve, the fluid pressure in the entire system activates the front and rear brake cylinders in the towed vehicle.

2. A hydraulic brake system according to claim 1 wherein the adjustable piston has gear teeth engagable with a pinion mounted within a piston chamber surrounding the adjustable piston, a door providing access through the piston chamber to permit mechanical turning of the pinion so that the adjustable piston is moved in a longitudinal direction.

3. A hydraulic brake system according to claim 1 wherein the second auxiliary brake cylinder, the second brake fluid conduit and the third auxiliary brake cylinder are disengaged from the brake system when the towed vehicle is separated from the towing vehicle.

4. A hydraulic brake system according to claim 3, wherein a locking dust cap is attached to the end of auxiliary brake cylinders one, two, three and four in the disengaged mode.

5. A hydraulic brake system according to claim 1 wherein a limit switch is electrically engaged to the valve when the valve allows the fluid in the third brake fluid conduit to be in contact with the fluid in the fourth brake fluid conduit.

6. A hydraulic brake system according to claim 1 wherein a pressure switch is mounted in the fourth brake fluid conduit to electrically activate a light in the towing vehicle when fluid pressure is exerted in the fourth brake fluid conduit.

7. A hydraulic brake system according to claim 1 wherein a lockable hinged cover provides access to a fluid reservoir in each auxiliary brake cylinder.

* * * * *